US012644860B2

(12) United States Patent (10) Patent No.: US 12,644,860 B2

Onuma (45) Date of Patent: Jun. 2, 2026

(54) METHOD FOR ANALYZING SAMPLE COMPRISING HEMOGLOBIN A2 BY CAPILLARY ELECTROPHORESIS

(71) Applicant: ARKRAY, Inc., Kyoto (JP)

(72) Inventor: Naotsugu Onuma, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 219 days.

(21) Appl. No.: 18/379,464

(22) Filed: Oct. 12, 2023

(65) Prior Publication Data

US 2024/0142402 A1 May 2, 2024

(30) Foreign Application Priority Data

Oct. 28, 2022 (JP) ................................. 2022-173452
Sep. 22, 2023 (JP) ................................. 2023-159205

(51) Int. Cl.
*G01N 27/447* (2006.01)

(52) U.S. Cl.
CPC . *G01N 27/44717* (2013.01); *G01N 27/44791* (2013.01)

(58) Field of Classification Search
None
See application file for complete search history.

(56) References Cited

U.S. PATENT DOCUMENTS

| | | | |
|---|---|---|---|
| 2016/0209359 A1 | 7/2016 | Onuma et al. | |
| 2018/0120256 A1 | 5/2018 | Kawano et al. | |
| 2019/0120790 A1 | 4/2019 | Kawano et al. | |

FOREIGN PATENT DOCUMENTS

| | | |
|---|---|---|
| JP | 2016-136135 A | 7/2016 |
| JP | 6846324 B2 | 3/2021 |
| JP | 6871129 B2 | 5/2021 |

OTHER PUBLICATIONS

Extended European Search Report issued in the corresponding Application No. 23205002.1, dated Mar. 20, 2024.

*Primary Examiner* — J. Christopher Ball
(74) *Attorney, Agent, or Firm* — Morgan, Lewis & Bockius LLP

(57) ABSTRACT

Provided is a method for analyzing a sample comprising hemoglobin A2 by capillary electrophoresis using an alkaline aqueous solution comprising a cationic polymer, which is the analysis method including the following steps: 1) obtaining an electropherogram of the sample by capillary electrophoresis; 2) specifying a detection time Tx of an X peak; 3) specifying a detection time Ta2 of an HbA2 peak; 4) specifying a detection time Ty of a Y peak; 5) calculating a correction coefficient from a relative relationship of the detection time Tx, Ta2, and Ty; 6) calculating a ratio of an HbA2 peak area to a total peak area or a ratio of a Y peak area to the total peak area in an electropherogram; and 7) correcting the ratio of the HbA2 peak area or the ratio of the Y peak area with the correction coefficient.

7 Claims, 2 Drawing Sheets

METHOD FOR ANALYZING SAMPLE COMPRISING HEMOGLOBIN A2 BY CAPILLARY ELECTROPHORESIS

CROSS-REFERENCE TO RELATED APPLICATION

This application claims priority under 35 USC 119 from Japanese Patent Applications No. 2022-173452 filed on Oct. 28 2022, and No. 2023-159205, filed on Sep. 22, 2023, the disclosures of which are incorporated by reference herein.

BACKGROUND

Technical Field

The present disclosure relates to a method for analyzing a sample comprising hemoglobin A2 by capillary electrophoresis.

Related Art

Analysis of hemoglobin (hereinafter also referred to as "Hb") is routinely performed in the field of clinical examination. The Hb type which is an analysis target varies depending on the purpose of examination. HbA1c is well known as an analysis target for diagnosing diabetes and understanding the condition. Mutant Hb represented by HbS (sickle cell Hb), HbC, HbD, HbE, and the like is used as an analysis target for diagnosing abnormal Hb disease. In addition, HbA2 and HbF (fetal Hb) are widely used as analysis targets for diagnosing β-thalassemia.

Analysis of Hb is performed by a high performance liquid chromatography (HPLC) method such as an ion exchange chromatography method, a capillary electrophoresis (CE) method, or the like.

Japanese Patent Application Laid-Open (JP-A) No. 2016-136135 describes a method for analyzing HbA2 by anion exchange electrokinetic chromatography using a solution comprising a cationic polymer as a pseudo stationary phase.

Japanese Patent No. 6846324 and Japanese Patent No. 6871129 describe an analysis method for identifying a component such as HbA1c using a time point at which an interface is reached by cation exchange electrokinetic chromatography using a solution comprising an anionic polymer as a pseudo stationary phase.

SUMMARY OF THE INVENTION

In the diagnosis of β-thalassemia or the like, an electropherogram is acquired by capillary electrophoresis, and the ratio of the HbA2 peak area to the total peak area calculated from this electropherogram may be used.

However, in recent years, there have been cases in which the calculated ratio of the HbA2 peak area varies, and more excellent precision is required. In addition, the ratio of the HbA2 peak area calculated from the electropherogram may deviate from the value measured by the control method, and excellent accuracy is also required.

An object of an embodiment of the present disclosure is to provide a method for analyzing a sample comprising hemoglobin A2 by capillary electrophoresis, through which a ratio of an HbA2 peak area or the like to a total peak area can be calculated with excellent precision and accuracy.

A method for analyzing a sample comprising hemoglobin A2 by capillary electrophoresis according to an embodiment of the present disclosure is an analysis method including the following steps 1) to 7) using an alkaline aqueous solution comprising a cationic polymer.

1) A step of obtaining an electropherogram of the sample by capillary electrophoresis
2) A step of specifying a detection time Tx of an X peak detected at a time earlier than an HbA2 peak
3) A step of specifying a detection time Ta2 of an HbA2 peak
4) A step of specifying a detection time Ty of a Y peak detected at a time later than the HbA2 peak
5) A step of calculating a correction coefficient from a relative relationship of the detection time Tx of the X peak, the detection time Ta2 of the HbA2 peak, and the detection time Ty of the Y peak
6) A step of calculating a ratio of an HbA2 peak area to a total peak area or a ratio of a Y peak area to the total peak area in an electropherogram
7) A step of correcting the ratio of the HbA2 peak area or the ratio of the Y peak area with the correction coefficient According to an embodiment of the present disclosure, it is possible to provide a method for analyzing a sample comprising hemoglobin A2 by capillary electrophoresis, through which a ratio of an HbA2 peak area or the like to a total peak area can be calculated with excellent precision and accuracy.

BRIEF DESCRIPTION OF THE DRAWINGS

FIG. 1, panel B is a cross-sectional view of the electrophoresis chip illustrated in FIG. 1, panel A.

DETAILED DESCRIPTION OF THE INVENTION

Figure 1:
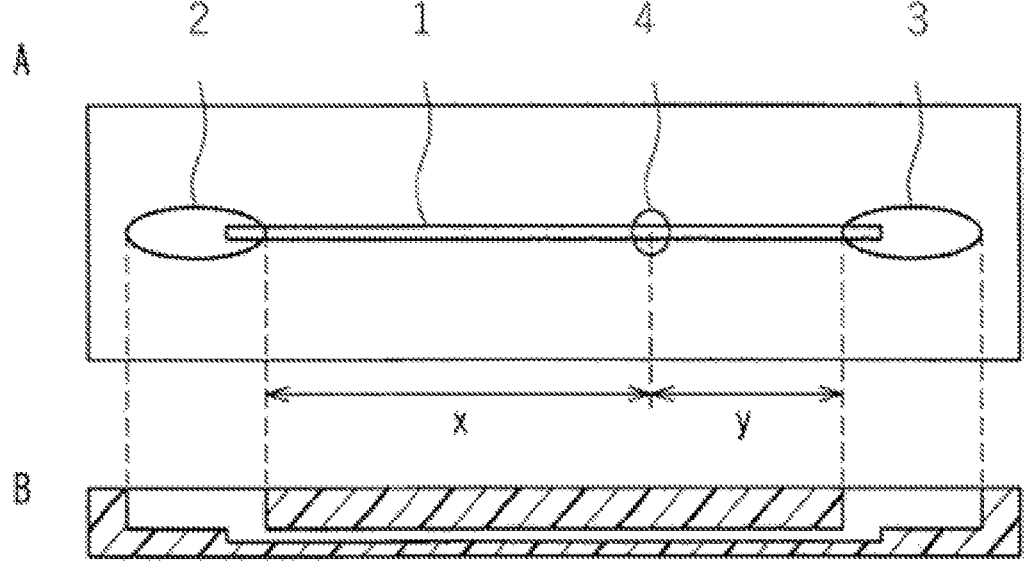
FIG. 1, panel A is a top view illustrating an embodiment of a capillary electrophoresis chip.

Hereinafter, an embodiment which is an example of the present invention will be described. This description and example illustrate an embodiment and do not limit the scope of the invention.

In the numerical ranges described step by step in the present disclosure, the upper limit value or the lower limit value of one numerical range may be replaced with the upper limit value or the lower limit value of another numerical range described step by step. Moreover, in the numerical ranges described in the disclosure, the upper limit value or the lower limit value of the numerical ranges may be replaced with the values illustrated in the examples.

Each component may contain a plurality of types of corresponding substances.

In a case in which there are a plurality of types of substances corresponding to each component in the composition, the amount of each component in the composition means the total amount of the plurality of types of substances present in the composition unless otherwise specified.

In the present disclosure, the term "step" includes not only an independent step but also a step that cannot be clearly distinguished from other steps as long as the intended purpose of the step is achieved.

In the present disclosure, a combination of two or more preferred aspects is a more preferred aspect.

When an embodiment is described with reference to the drawings in the present disclosure, the configuration of the embodiment is not limited to the configuration illustrated in the drawings. In addition, the sizes of the members in each drawing are conceptual, and the relative relationship between the sizes of the members is not limited thereto.

[Analysis Method]

An analysis method according to an embodiment of the present disclosure (hereinafter also referred to as a "specific analysis method") is a method for analyzing a sample comprising hemoglobin A2 by capillary electrophoresis using an alkaline aqueous solution comprising a cationic polymer, and includes the following steps.

1) A step of obtaining an electropherogram of the sample by capillary electrophoresis (hereinafter also referred to as "first step")

2) A step of specifying a detection time Tx of an X peak detected at a time earlier than an HbA2 peak (hereinafter also referred to as "second step")

3) A step of specifying a detection time Ta2 of an HbA2 peak (hereinafter also referred to as "third step")

4) A step of specifying a detection time Ty of a Y peak detected at a time later than the HbA2 peak (hereinafter also referred to as "fourth step")

5) A step of calculating a correction coefficient from a relative relationship of the detection time Tx of the X peak, the detection time Ta2 of the HbA2 peak, and the detection time Ty of the Y peak (hereinafter also referred to as "fifth step")

6) A step of calculating a ratio of an HbA2 peak area to a total peak area or a ratio of a Y peak area to the total peak area in an electropherogram (hereinafter also referred to as "sixth step")

7) A step of correcting the ratio of the HbA2 peak area or the ratio of the Y peak area with the correction coefficient (hereinafter also referred to as "seventh step")

According to a specific analysis method, it is possible to calculate the ratio of the HbA2 peak area or the like to the total peak area with excellent precision and accuracy. The reason why the above effect is exhibited is not clear, but it is presumed as follows.

In the specific analysis method, the ratio of the HbA2 peak area to the calculated total peak area or the ratio of the Y peak area to the calculated total peak area is corrected with the correction coefficient calculated from the relative relationship of the detection time Tx of the X peak, the detection time Ta2 of the HbA2 peak, and the detection time Ty of the Y peak. Accordingly, it is presumed to improve the precision and accuracy of the ratio of the HbA2 peak area to the calculated total peak area or the ratio of the Y peak area to the calculated total peak area.

The reason why the ratio of the HbA2 peak area calculated from the electropherogram deviates from the value measured by the control method is presumed to be that the ratio may increase or decrease due to the area depending on the peak following the HbA2 peak.

In a preferred embodiment, the second step to the fourth step are performed after the first step. The order of the second step to the fourth step is not particularly limited.

In a preferred embodiment, the fifth step to the sixth step are performed after the second step to the fourth step. The order of the fifth step to the sixth step is not particularly limited.

In a preferred embodiment, the seventh step is performed after the fifth step to the sixth step.

(First Step)

In the first step, an electropherogram of a sample is obtained by capillary electrophoresis.

The electropherogram can be obtained by separating Hb in a sample by capillary electrophoresis in an alkaline solution, detecting the separated Hb, obtaining an absorbance spectrum, and differentiating the waveform of the absorbance spectrum with respect to time.

—Separation—

Separation of Hb is performed by capillary electrophoresis in an alkaline solution.

The sample contains HbA2. The sample may contain HbE, HbA, HbF, HbC, HbD, HbG, HbS, or the like.

Separation of Hb in a sample by capillary electrophoresis in an alkaline solution can be performed by using a device including a capillary flow path.

Specifically, separation can be performed by introducing the sample into the capillary flow path filled with the alkaline solution, and applying a voltage to the entirety or a part of the capillary flow path after introduction of the sample. By applying the voltage, Hb in the sample can be electrophoresed and separated.

The voltage can be applied to the capillary flow path by bringing a negative electrode into contact with the sample introduction side of the capillary flow path and bringing a positive electrode into contact with the alkaline solution supply side.

The cross-sectional shape of the capillary flow path is not particularly limited, and may be a circular shape, a rectangular shape, or another shape.

In the case of the rectangular shape, each of the flow path height and the flow path width of the capillary flow path is preferably from 1 µm to 1000 µm, more preferably from 10 µm to 200 µm, and still more preferably from 25 µm to 100 µm. In the case of the circular shape, the inner diameter of the capillary flow path is preferably 10 µm or more or 25 µm or more, and preferably 100 µm or less or 75 µm or less.

The flow path length of the capillary flow path is preferably from 10 mm to 150 mm, and more preferably from 20 mm to 60 mm.

Examples of the material of the capillary flow path include glass, fused silica, and plastic. Examples of the plastic include polymethyl methacrylate (PMMA), polycarbonate, polystyrene, polytetrafluoroethylene (PTFE), and polyetheretherketone (PEEK).

In the separation step, a capillary electrophoresis chip in which the above-described capillary flow path is made into a microchip may be used.

The capillary electrophoresis chip can include a sample holding tank, an electrophoretic liquid holding tank, and a capillary flow path, and the sample holding tank and the electrophoretic liquid holding tank communicate with each other through the capillary flow path.

The size of the capillary electrophoresis chip is not particularly limited, and is preferably appropriately adjusted. The size of the capillary electrophoresis chip can be, for example, from 10 mm to 200 mm in length, from 1 mm to 60 mm in width, and from 0.3 mm to 5 mm in thickness.

The volumes of the sample holding tank and the electrophoretic liquid holding tank are appropriately determined according to the inner diameter and the length of the capillary flow path, and are each preferably from 1 $mm^3$ to 1000 $mm^3$, and more preferably from 5 $mm^3$ to 100 $mm^3$.

The amount of the sample to be filled into the sample holding tank is not particularly limited, and may be from 1 µL to 30 µL.

The amount of the alkaline solution to be filled into the electrophoretic liquid holding tank is not particularly limited, and may be from 1 µL to 30 µL.

The voltage applied to both ends of the capillary flow path is preferably from 500 V to 10,000 V, and more preferably from 500 V to 5,000 V.

In the capillary flow path, a liquid flow from the negative electrode side toward the positive electrode side may be generated. Examples of the liquid flow include an electro-osmotic flow.

The inner wall of the capillary flow path is preferably coated with a cationic substance or an anionic substance.

By coating the inner wall of the capillary flow path with the cationic substance, the inner wall of the capillary flow path can be positively charged. As a result, an electro-osmotic flow from the negative electrode side toward the positive electrode side can be easily generated in the capillary flow path.

When the inner wall of the capillary flow path is coated with the anionic substance, the inner wall of the capillary flow path is negatively charged, but the cationic polymer contained in the alkaline solution is bound to the inner wall of the negatively charged capillary flow path. As a result, the inner wall of the capillary flow path is positively charged, and the electro-osmotic flow from the negative electrode side toward the positive electrode side can be easily generated in the capillary flow path as described above.

The cationic substance is not particularly limited, and a silane coupling agent having a cationic functional group and the like can be used. From the viewpoint of improving the separation accuracy, the cationic substance is preferably a polymer having a quaternary ammonium base, and more preferably polydiallyldimethylammonium chloride.

The anionic substance is not particularly limited, and polysaccharides having an anionic group, silane coupling agents having an anionic functional group, and the like can be used.

Examples of the polysaccharide having an anionic group include sulfated polysaccharides, carboxylated polysaccharides, sulfonated polysaccharides, and phosphorylated polysaccharides.

Examples of the sulfated polysaccharide include chondroitin sulfate, heparin, heparan, fucoidan, and salts thereof. Examples of the carboxylated polysaccharide include alginic acid, hyaluronic acid, and salts thereof.

FIGS. 1, panel A and FIG. 1, panel B illustrate an embodiment of a capillary electrophoresis chip. FIG. 1, panel A is a top view illustrating an embodiment of the capillary electrophoresis chip, and FIG. 1, panel B is a cross-sectional view of the electrophoresis chip illustrated in FIG. 1, panel A.

The capillary electrophoresis chip illustrated in FIGS. 1, panel A and 1, panel B includes a capillary flow path 1, a sample holding tank 2, and an electrophoretic liquid holding tank 3, and the sample holding tank 2 and the electrophoretic liquid holding tank 3 communicate with each other through the capillary flow path 1. A detection unit 4 is formed in the capillary flow path 1.

The sample holding tank 2 and the electrophoretic liquid holding tank 3 may each include an electrode for applying a voltage to both ends of the capillary flow path 1 (not illustrated). Specifically, the sample holding tank 2 (sample introduction side) may include a negative electrode, and the electrophoretic liquid holding tank 3 (alkaline solution supply side) may include a positive electrode.

The position of the detection unit 4, that is, the length required for the separation (distance from the sample holding tank 2 to the detection unit 4, x in FIG. 1, panel A) can be appropriately determined according to the length or the like of the capillary flow path 1. When the length (x+y in FIG. 1, panel A) of the capillary flow path 1 is from 10 mm to 150 mm, the distance (x) from the sample holding tank 2 to the detection unit 4 is preferably from 5 mm to 140 mm, more preferably from 10 mm to 100 mm, and still more preferably from 15 mm to 50 mm.

—Alkaline Solution—

In the disclosure, "alkaline" means that the pH is more than 7.0. The pH of the specific alkaline solution is preferably higher than the isoelectric points of Hb, and is preferably from 7.5 to 12.0, more preferably from 8.5 to 11.0, and still more preferably from 9.5 to 10.5.

In the disclosure, the pH of the alkaline solution is the pH of the alkaline solution at 25° C., and is measured using a pH meter 30 minutes after the electrode is immersed. As the pH meter, F-72 manufactured by HORIBA, Ltd. or a device similar thereto can be used.

———Cationic Polymer———

The alkaline solution contains a cationic polymer. The alkaline solution may contain two or more cationic polymers.

In the present disclosure, the "cationic polymer" means a polymer having a cationic group.

In the present disclosure, the "cationic group" includes a cationic group and a group that is ionized to become a cationic group.

Examples of the cationic group include a primary amino group, a secondary amino group, a tertiary amino group, a quaternary ammonium base, and an imino group.

The cationic polymer is preferably water-soluble. In the present disclosure, "water-soluble" means that the target substance is dissolved in an amount of 1% by mass or more in water at 25° C.

Examples of the cationic polymer having primary to tertiary amino groups or a cationic group capable of being ionized into a primary to tertiary amino groups include polyallylamine, polyvinylamine, polylysine, polyarginine, polyhistidine, polyornithine, polydiallylamine, polymethyldiallylamine, polyethyleneimine, diallylamine-acrylamide polymer, dimethylamine-ammonia-epichlorohydrin polymer, and allylamine-diallylamine polymer. The cationic polymer described above may be in the form of a salt, and examples thereof include hydrochloride.

Examples of the cationic polymer having an imino group or a cationic group capable of being ionized on an imino group include polyethyleneimine.

Examples of the cationic polymer having a quaternary ammonium base or a cationic group that can be ionized into a quaternary ammonium base include polyquaternium, a dimethylamine-ammonia-epichlorohydrin polymer, and a dimethylamine-epichlorohydrin polymer.

In the disclosure, "polyquaternium" refers to a cationic polymer comprising a constituent unit derived from a monomer having a quaternary ammonium group. Polyquaternium can be confirmed by International Nomenclature for Cosmetic Ingredients (INCI) directory. In one or more embodiments, examples of the polyquaternium include polydiallyldimethylammonium salts such as polyquaternium-6 (poly (diallyldimethylammonium chloride)), polyquaternium-7 (copolymer of acrylamide and diallyldimethylammonium chloride), polyquaternium-4(diallyldimethylammonium chloride-hydroxyethyl cellulose copolymer), and polyquaternium-22(copolymer of acrylic acid and diallyldimethylammonium chloride); and polyquaternium-2(poly[bis(2-chloroethyl)ether-alt-1,3-bis[3-(dimethylamino)propyl] urea]).

As the cationic polymer, in addition to the ammonium salt, in one or more embodiments, a cationic polymer of an onium salt such as a phosphonium salt, an oxonium salt, a sulfonium salt, a fluoronium salt, or a chloronium salt can also be used.

Examples of the cationic polymer having a hydrazide group or a cationic group capable of being ionized on the hydrazide group include amino poly acrylamide.

From the viewpoint of shortening the separation time, the weight average molecular weight of the cationic polymer is preferably from 10,000 to 500,000.

In the present disclosure, the weight average molecular weight of the cationic polymer refers to the catalogue value. When there is no catalogue value of the weight average molecular weight, the weight average molecular weight is a weight average molecular weight in terms of polyethylene glycol measured by a gel permeation chromatography (GPC) method.

From the viewpoint of shortening the separation time, the content of the specific cationic polymer with respect to the total mass of the alkaline solution is preferably from 0.5% by mass to 10% by mass, more preferably from 0.75% by mass to 5.0% by mass, and still more preferably from 1.0% by mass to 3.0% by mass.

As the cationic polymer, a polymer synthesized by a conventionally known method may be used, or a commercially available polymer may be used.

————Water————

The alkaline solution may contain water. Examples of the water include distilled water, ion-exchanged water, pure water, and ultrapure water.

The content of water with respect to the total mass of the alkaline solution is not particularly limited, and may be from 10% by mass to 99.9% by mass.

————Additive————

The alkaline solution may contain additives such as a non-surfactant type zwitterionic substance, a pH buffering substance, and a preservative for suppressing proliferation of microorganisms and the like. Examples of the preservative include sodium azide, ethylparaben, and ProClin.

—Sample—

The sample contains HbA2. The sample may contain HbE, HbA, HbF, HbC, HbD, HbG, HbS, and the like, which form a Y peak detected at a time later than the HbA2 peak. The Y peak will be described later.

The content of Hb with respect to the total mass of the sample is not particularly limited, and may be from 0.001% by mass to 100% by mass.

The form of the sample is not particularly limited, and the sample raw material may be prepared, or may be the sample raw material itself.

Examples of the sample raw material include raw materials comprising Hb, biological samples, and the like.

Examples of the biological sample include blood and a blood derivative comprising a red blood cell component or the like.

Examples of the blood include blood collected from a living body, and include blood of mammals other than human, and blood of human.

Examples of the blood derivative comprising a red blood cell component include those separated or prepared from blood and comprising a red blood cell component. Examples thereof include a blood cell fraction from which plasma is removed, a blood cell concentrate, a lyophilizate of blood or blood cells, a hemolysis sample obtained by hemolysis of whole blood, centrifuged blood, naturally precipitated blood, and washed blood cells.

From the viewpoint of improving the separation accuracy, the sample preferably contains an alkaline solution comprising a cationic polymer.

The sample comprising the alkaline solution can be obtained by diluting the sample raw material using the alkaline solution. The dilution rate is preferably from 1.2 times to 100 times, more preferably from 2 times to 60 times, and still more preferably from 3 times to 50 times on a mass basis. The material used for dilution is not particularly limited, and examples thereof include a pH adjusting agent (for example, hydrochloric acid), a surfactant (for example, EMULGEN LS-110 (manufactured by Kao Corporation)), an antiseptic agent (for example, sodium azide), an ionic strength adjusting agent (for example, sodium chloride), and a refractive index adjusting agent (for example, saccharides such as sucrose).

The alkaline solution may be the same as or different from the alkaline solution filled into the capillary flow path.

—Detection Step—

Hb can be detected by irradiating separated Hb with light having a wavelength from 415 to 420 nm to obtain an absorbance spectrum in which the vertical axis represents absorbance and the horizontal axis represents time.

When a capillary electrophoresis chip is used for separating Hb, it is preferable to irradiate the detection unit with light having a wavelength from 415 to 420 nm.

The absorbance spectrum can be obtained by using The Lab 001 manufactured by ARKRAY, Inc. or a device similar thereto.

An electropherogram (differential waveform) can be obtained by differentiating the waveform of the absorbance spectrum with respect to time.

With reference to FIGS. 1A and 1B, an embodiment of the separation and detection described above will be described. The separation and detection are not limited to the methods described below.

First, the electrophoretic liquid holding tank 3 of the capillary electrophoresis chip is filled with an alkaline solution comprising a cationic polymer as an electrophoretic liquid, and the capillary flow path 1 is filled with the alkaline solution by capillary phenomenon.

Next, a sample is supplied to the sample holding tank 2 of the capillary electrophoresis chip filled with the alkaline solution. This supply is preferably carried out continuously.

The sample to be supplied to the sample holding tank 2 can be prepared by diluting whole blood, which is a sample raw material, with the alkaline solution.

A negative electrode is brought into contact with the sample holding tank 2, and a positive electrode is brought into contact with the electrophoretic liquid holding tank 3 (not illustrated), and a voltage is applied between both ends of the capillary flow path 1, that is, between the sample holding tank 2 and the electrophoretic liquid holding tank 3. As a result, a sample is introduced from the sample holding tank 2 into the capillary flow path 1, a sample comprising Hb moves from the sample holding tank 2 toward the electrophoretic liquid holding tank 3, and separation of Hb is performed.

Then, the detection unit 4 emits light having a wavelength from 415 to 420 nm, and the absorbance measurement device measures the absorbance to detect Hb.

(Second Step)

In the second step, the detection time Tx of the X peak detected at a time earlier than the HbA2 peak is specified. In one embodiment, the X peak is due to electro-osmotic flow (EOF).

In one embodiment, the X peak is a signal of interface detection caused by the interface between the sample and the electrophoretic liquid, more specifically, a peak detected at the time when the interface reaches the position of the detection unit 4 of the capillary flow path 1 (interface arrival time).

The X peak may be a peak detected at a time earlier than the HbA2 peak among peaks derived from the sample.

In addition, the X peak may be a peak derived from a marker added to the sample holding tank in addition to the sample. The marker may be an inorganic compound or an organic compound as long as the marker absorbs light in a wavelength range of from 415 to 420 nm and has a charge detected at a time earlier than the HbA2 peak.

The detection time Tx of the X peak can be specified from the electropherogram.

More specifically, in the electropherogram, a peak in which the absorbance variation exceeds 0.1 mAbs/sec first is defined as an X peak, and the top and bottom of the peak are determined by the method described in Japanese Patent Application Laid-Open (JP-A) No. 2020-30116. For the subsequent peaks, the top and bottom of the peak are determined by the same method.

(Third Step)

In the third step, the detection time of the HbA2 peak is specified. The detection time Ta2 of the HbA2 peak can be specified from the electropherogram.

With the X peak as a starting point, the first detected peak having an area ratio (corresponding peak area/total peak area) of 1% or more is defined as an HbA2 peak.

(Fourth Step)

In the fourth step, the detection time Ty of the Y peak detected at a time later than the HbA2 peak is specified. The detection time Ty of the Y peak can be specified from the electropherogram.

With the X peak as a starting point, the second detected peak having an area ratio (corresponding peak area/total peak area) of 10% or more is defined as a Y peak.

(Fifth Step)

In the fifth step, the correction coefficient is calculated from the relative relationship of the detection time Tx of the X peak, the detection time Ta2 of the HbA2 peak, and the detection time Ty of the Y peak.

The correction coefficient may be a value representing a relative relationship of three detection times Tx, Ta2, and Ty.

The correction coefficient is preferably a ratio of a difference between the detection time Ta2 of the HbA2 peak and the detection time Tx of the X peak which is an electro-osmotic flow (EOF) signal peak (signal of interface detection) and a difference between the detection times Ty and Tx of the Y peak.

Specifically, the correction coefficient is preferably represented by (Ty–Tx)/(Ta2–Tx) or (Ta2–Tx)/(Ty–Tx).

Note that the correction coefficient may be (Tx–Ta2)/(Ty–Ta2), (Ty–Ta2)/(Tx–Ta2), (Tx–Ty)/(Ta2–Ty), (Ta2–Ty)/(Tx–Ty), or the like.

Note that the correction coefficient is not limited to the above example.

Regardless of the method for calculating the correction coefficient, the ratio of the HbA2 peak area or the ratio of the Y peak area can be corrected in the same manner by adjusting the correction coefficient, the correction formula, or a predetermined coefficient different from the correction coefficient used in the seventh step to be described later.

(Sixth Step)

In the sixth step, the ratio of the HbA2 peak area or the ratio of the Y peak area to the total peak area is calculated in the electropherogram.

(Seventh Step)

In the seventh step, the ratio of the HbA2 peak area or the ratio of the Y peak area is corrected with the correction coefficient.

In one embodiment, the correction is performed based on a correction coefficient and a predetermined coefficient different from the correction coefficient.

In a case where the correction coefficient is obtained by (Ty–Tx)/(Ta2–Tx) or (Ta2–Tx)/(Ty–Tx), the coefficient decreases as the value of the correction coefficient deviates from 1.

In one embodiment, when the correction coefficient is 1.010 or more and less than 1.047, the ratio of the HbA2 peak area or the Y peak area and the correction coefficient are substituted into the following formula to obtain the corrected value. In the following formula, predetermined coefficients are –90 and 95.2.

$$\text{corrected value (\%)} = \text{ratio of HbA2 peak area or } Y \text{ peak area}/(-90 \times \text{correction coefficient} + 95.2)$$

In one embodiment, when the correction coefficient is 1.047 or more and less than 1.207, the ratio of the HbA2 peak area or the Y peak area and the correction coefficient are substituted into the following formula to obtain the corrected value. In the following formula, predetermined coefficients are –3.5 and 5.43.

$$\text{corrected value (\%)} = \text{ratio of HbA2 peak area or } Y \text{ peak area}/(-3.5 \times \text{correction coefficient} + 5.43)$$

In one embodiment, when the correction coefficient is 1.207 or more and less than 1.450, the ratio of the HbA2 peak area or the Y peak area and the correction coefficient are substituted into the following formula to obtain the corrected value. In the following formula, predetermined coefficients are –2.5 and 4.26.

$$\text{corrected value (\%)} = \text{ratio of HbA2 peak area or } Y \text{ peak area}/(-2.5 \times \text{correction coefficient} + 4.26)$$

Figure 2:
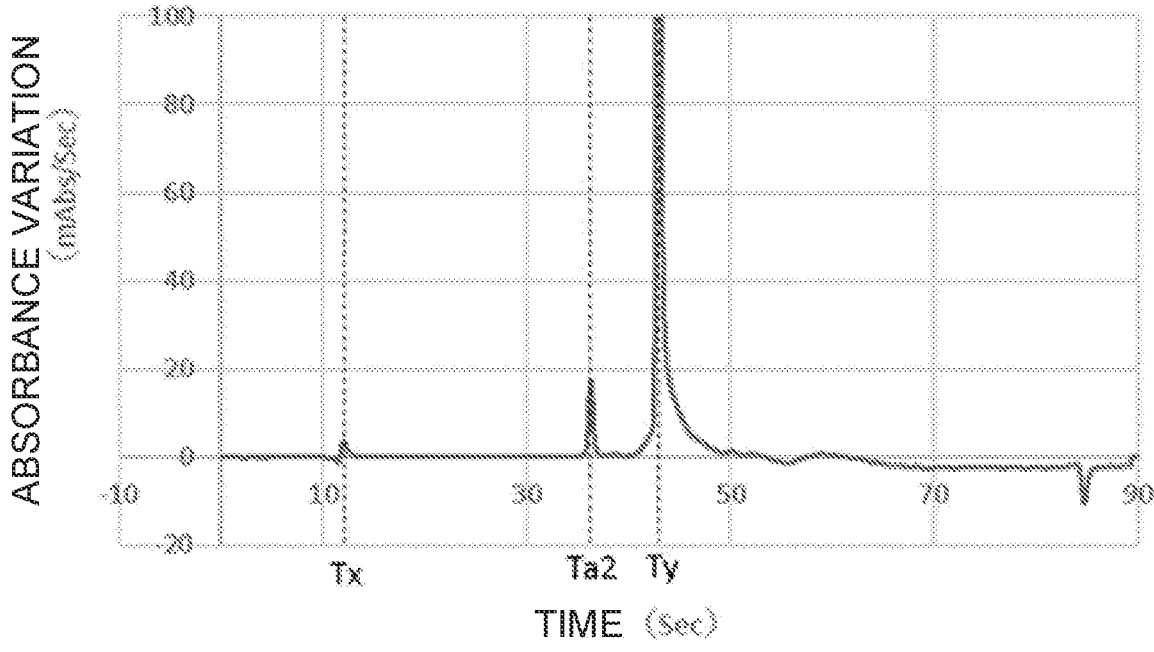
FIG. 2 shows an electropherogram.

FIG. 2 shows an electropherogram.

In FIG. 2, the detection time of the X peak is indicated by Tx, the detection time of the HbA2 peak is indicated by Ta2, and the detection time of the Y peak is indicated by Ty.

This analysis method can be used for applications such as prevention, diagnosis, and treatment of abnormal Hb disease and β-thalassemia.

The present disclosure may relate to the following embodiments.

<1> A method for analyzing a sample comprising hemoglobin A2 by capillary electrophoresis using an alkaline aqueous solution comprising a cationic polymer, which is the analysis method including the following steps 1) to 7):

1) a step of obtaining an electropherogram of the sample by capillary electrophoresis;

2) a step of specifying a detection time Tx of an X peak detected at a time earlier than an HbA2 peak;

3) a step of specifying a detection time Ta2 of an HbA2 peak;

4) a step of specifying a detection time Ty of a Y peak detected at a time later than the HbA2 peak;

5) a step of calculating a correction coefficient from a relative relationship of the detection time Tx of the X peak, the detection time Ta2 of the HbA2 peak, and the detection time Ty of the Y peak;

6) a step of calculating a ratio of an HbA2 peak area to a total peak area or a ratio of a Y peak area to the total peak area in an electropherogram; and 7) a step of correcting the ratio of the HbA2 peak area or the ratio of the Y peak area with the correction coefficient.

<2> The analysis method according to the <1>, in which the correction coefficient is obtained by (Ty–Tx)/(Ta2–Tx) or (Ta2–Tx)/(Ty–Tx).

<3> The analysis method according to the <1> or <2>, in which correction of the ratio of the HbA2 peak area or the Y peak area is performed based on the correction coefficient and a predetermined coefficient different from the correction coefficient.

<4> The analysis method according to the <3>, in which the predetermined coefficient varies according to a value of the correction coefficient.

<5> The analysis method according to the <2>, in which correction of the ratio of the HbA2 peak area or the Y peak area is performed based on the correction coefficient and a predetermined coefficient different from the correction coefficient, and the predetermined coefficient decreases as the value of the correction coefficient deviates from 1.

<6> The analysis method according to any one of the <1> to <5>, in which capillary electrophoresis is performed using a device including a capillary flow path, and an inner wall of the capillary flow path is coated with a cationic polymer comprising a quaternary ammonium base.

<7> The analysis method according to the <6>, in which the sample is continuously supplied to the capillary flow path.

EXAMPLES

Examples will be described below, but the present disclosure is not limited to these examples at all. In the following description, unless otherwise specified, "part" and "%" are all on a mass basis.

<Separation Device and Measurement Equipment>

As the separation device, a resin-made chip (flow path width: 40 μm, flow path height: 40 μm, flow path length: 30 mm, distance (x) from the sample holding tank 2 to detection unit 4: 20 mm) having the capillary flow path 1 having the structure illustrated in FIG. 1, panel A and FIG. 1, panel B was used. The capacity of the sample holding tank 2 and the electrophoretic liquid holding tank 3 was set to 10 μL. The inner wall of the capillary flow path was coated with polydiallyldimethylammonium chloride.

As the measurement device, an in-house electrophoresis device was used.

Example 1

Each of the following substances was mixed, and sodium hydroxide and water were added until the pH reached 9.8 to prepare an alkaline solution (capillary electrophoresis solution) 1.

(Composition of Alkaline Solution 1)

Dimethylamine-ammonia-epichlorohydrin polycondensate (cationic polymer, manufactured by SENKA Corporation, Unisense KHE 1000 L, weight average molecular weight from 100,000 to 500,000) . . . 1.5% by mass Sodium azide . . . 0.02% by mass Sodium hydroxide Water The whole blood of a healthy subject was diluted with an alkaline solution (pH 8.8) having the following composition (dilution rate 41 times (mass basis)) to obtain the sample A. In addition, hydrochloric acid and water were added until the pH of the solution reached 8.8.

(Composition of Alkaline Solution)

Polyethyleneimine (manufactured by FUJIFILM Wako Pure Chemical Corporation, weight average molecular weight 70,000) . . . 1% by mass EMULGEN LS-110 (manufactured by Kao Corporation) . . . 0.4% by mass Sodium azide . . . 0.02% by mass Sucrose . . . 7.87% by mass Sodium chloride . . . 0.26% by mass Hydrochloric acid Water 9 μL of the alkaline solution 1 was supplied to the electrophoretic liquid holding tank 3, and the capillary flow path 1 was filled with the alkaline solution 1 by capillary phenomenon.

9 μL of the sample A was supplied to the sample holding tank 2.

Next, a negative electrode was brought into contact with the sample holding tank 2, and a positive electrode was brought into contact with the electrophoretic liquid holding tank 3, and electrophoresis was started by applying a voltage under constant current control of 75 μA.

During electrophoresis, the detection unit 4 was irradiated with light of 415 nm, and the absorbance was measured to obtain an absorbance spectrum. An electropherogram was obtained by differentiating the waveform of the absorbance spectrum with respect to time. Further, electrophoresis was performed for 90 seconds. The obtained electropherogram is illustrated in FIG. 2.

Incidentally, The Lab 001 manufactured by ARKRAY, Inc. was used for light irradiation, measurement of absorbance, and acquisition of an electropherogram.

From the electropherogram, an X peak, an HbA2 peak, and a Y peak were specified, and the detection time (Tx, Ta2, Ty) of each peak was specified.

Here, X peak=electro-osmotic flow (EOF) signal peak (signal of interface detection), Y peak=HbA peak.

A correction coefficient Ry was obtained based on the following formula.

$$Ry = (Ty - Tx)/(Ta2 - Tx)$$

In the electropherogram, the ratio A (%) of the HbA2 peak area to the total peak area was determined.

Since the correction coefficient Ry corresponded to 1.207 or more and less than 1.450, the ratio A of the HbA2 peak area to the total peak area was corrected based on the following formula, and the corrected value A (%) was calculated.

$$corrected\ value = ratio\ of\ HbA2\ peak\ area\ to\ total\ peak\ area/(-2.5 \times Ry + 4.26)$$

The measurement of the ratio A (%) of the HbA2 peak area to the total peak area and the corrected value A was performed 160 times, and the average value (average corrected value A) and the standard deviation of the corrected value A are shown in Table 1.

Example 2

The sample B was obtained by diluting whole blood of a β-thalassemia patient with an alkaline solution (pH 8.8) having the above composition (dilution rate 41 times (mass basis)). In addition, hydrochloric acid and water were added until the pH of the solution reached 8.8.

An average corrected value B (%) and the like were obtained in the same manner as in Example 1 except that the sample A was changed to the sample B. The average corrected value B and the standard deviation are shown in Table 1.

Comparative Example 1

The average value (160 times average) of the ratio A of the HbA2 peak area to the total peak area obtained in Example 1, and standard deviation are shown in Table 1 as Comparative Example 1.

Comparative Example 2

The average value (average of 160 times) of the ratio B of the HbA2 peak area to the total peak area obtained in Example 2, and standard deviation are shown in Table 1 as Comparative Example 2.

<<Precision Evaluation>>

In Example 1 and Example 2, the standard deviation was divided by the average corrected value A or the average corrected value B and then multiplied by 100 to determine the precision (%). The results are shown in Table 1.

In Comparative Example 1 and Comparative Example 2, the standard deviation was divided by the average value (average of 160 times) of the ratio A or the ratio B of the HbA2 peak area to the total peak area, and then multiplied by 100 to determine the precision (%). The results are shown in Table 1.

TABLE 1

| | Average corrected value (%) | Average value of ratio of HbA2 peak area to total peak area (%) | Standard deviation | Precision (%) |
|---|---|---|---|---|
| Example 1 | 5.47 | — | 0.110 | 2.0 |
| Example 2 | 2.92 | — | 0.071 | 2.4 |
| Comparative Example 1 | — | 5.37 | 0.148 | 2.8 |
| Comparative Example 2 | — | 3.17 | 0.116 | 3.7 |

Example 3

The whole blood of the mutant HbE carrier was diluted (dilution rate 41 times (mass basis)) with an alkaline solution (pH 8.8) having the above composition to obtain the sample C. In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), and Y peak=HbE peak.

A correction coefficient Ry was obtained based on the following formula.

$$Ry=(Ty-Tx)/(Ta2-Tx)$$

In the electropherogram, the ratio C (%) of the HbA2 peak area to the total peak area was determined.

The ratio C of the HbA2 peak area to the total peak area was corrected by Ry based on the following formula, and the corrected value C (%) was calculated. The results are shown in Table 2.

$$\text{corrected value}=\text{ratio of HbA2 peak area to total peak area}/(-90\times Ry+95.2)$$

Comparative Example 3

The ratio C (%) of the HbA2 peak area to the total peak area obtained in Example 3 is shown in Table 2 as Comparative Example 3.

<<Accuracy Evaluation>>

For the sample C, a ratio Z1(%) of the HbA2 peak area to the total peak area was determined by the control method (Capillarys 2, Sebia).

The corrected value C obtained in Example 3 and the ratio Z1 of the HbA2 peak area to the total peak area were substituted into the following formula to calculate the error ratio. The results are shown in Table 2.

$$\text{error ratio (\%)}=[\ ][\text{corrected value } C-\text{ratio } Z1 \text{ of HbA2 peak area to total peak area}]/\text{ratio } Z1 \text{ of HbA2 peak area to total peak area}]\times 100$$

The ratio C (%) of the HbA2 peak area to the total peak area obtained in Example 3 and the ratio Z1 of the HbA2 peak area to the total peak area were substituted into the following formula to calculate the error ratio. The results are shown in Table 2.

$$\text{error ratio (\%)}=[\ ][\text{ratio } C \text{ (\%) of HbE peak area to total peak area}-\text{ratio } Z1 \text{ of HbA2 peak area to total peak area}]/\text{ratio } Z1 \text{ of HbA2 peak area to total peak area}]\times 100$$

TABLE 2

| | Ry | Corrected value C (%) | Ratio C of HbA2 peak area to total peak area (%) | Ratio Z1 of HbA2 peak area to total peak area (%) | Error ratio (%) |
|---|---|---|---|---|---|
| Example 3 | 1.035 | 3.58 | — | 3.3 | 8.5 |
| Comparative Example 3 | — | — | 7.37 | 3.3 | 123.3 |

Example 4

The whole blood of the mutant HbC carrier was diluted (dilution rate 41 times (mass basis)) with an alkaline solution (pH 8.8) having the above composition to obtain the sample D. In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), and Y peak=HbC peak.

A correction coefficient Ry was obtained based on the following formula.

$$Ry=(Ty-Tx)/(Ta2-Tx)$$

In the electropherogram, the ratio D (%) of the HbA2 peak area to the total peak area was determined.

The ratio D of the HbA2 peak area to the total peak area was corrected by Ry based on the following formula, and the corrected value D (%) was calculated. The results are shown in Table 3.

$$\text{corrected value}=\text{ratio of HbA2 peak area to total peak area}/(-3.5 \times Ry+5.43)$$

Comparative Example 4

The ratio D (%) of the HbA2 peak area to the total peak area obtained in Example 4 is shown in Table 3 as Comparative Example 4.

<<Accuracy Evaluation>>

For the sample D, a ratio Z2(%) of the HbA2 peak area to the total peak area was determined by the control method (Capillarys 2, Sebia).

The corrected value D obtained in Example 4 and the ratio Z2 of the HbA2 peak area to the total peak area were substituted into the following formula to calculate the error ratio. The results are shown in Table 3.

$$\text{error ratio (\%)}=[\ ]\text{corrected value } D-\text{ratio } Z2 \text{ of HbA2 peak area to total peak area]/ratio } Z2 \text{ of HbA2 peak area to total peak area}]\times100$$

The ratio D (%) of the HbA2 peak area to the total peak area obtained in Example 4 and the ratio Z2 of the HbA2 peak area to the total peak area were substituted into the following formula to calculate the error ratio. The results are shown in Table 3.

$$\text{error ratio (\%)}=[\ ]\text{ratio } D \text{ (\%) of HbA2 peak area to total peak area}-\text{ratio } Z2 \text{ of HbA2 peak area to total peak area]/ratio } Z2 \text{ of HbA2 peak area to total peak area}]\times100$$

TABLE 3

| | Ry | Corrected value D (%) | Ratio D of HbA2 peak area to total peak area (%) | Ratio Z2 of HbA2 peak area to total peak area (%) | Error ratio (%) |
|---|---|---|---|---|---|
| Example 4 | 1.076 | 3.01 | — | 3.2 | 5.9 |
| Comparative Example 4 | — | — | 5.02 | 3.2 | 56.9 |

Example 5

The whole blood of the mutant HbD carrier was diluted (dilution rate 41 times (mass basis)) with an alkaline solution (pH 8.8) having the above composition to obtain the sample E. In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), and Y peak=HbD peak.

A correction coefficient Ry was obtained based on the following formula.

$$Ry=(Ty-Tx)/(Ta2-Tx)$$

In the electropherogram, the ratio E (%) of the HbA2 peak area to the total peak area was determined.

The ratio E of the HbA2 peak area to the total peak area was corrected by Ry based on the following formula, and the corrected value E (%) was calculated. The results are shown in Table 4.

$$\text{corrected value}=\text{ratio of HbA2 peak area to total peak area}/(-3.5 \times Ry+5.43)$$

Comparative Example 5

The ratio E (%) of the HbA2 peak area to the total peak area obtained in Example 5 is shown in Table 4 as Comparative Example 5.

<<Accuracy Evaluation>>

The ratio Z3(%) of the HbA2 peak area to the total peak area was determined in the electropherogram of the sample E by the control method (Capillarys 2, Sebia).

The corrected value E obtained in Example 5 and the ratio Z3 of the HbA2 peak area to the total peak area were substituted into the following formula to calculate the error ratio. The results are shown in Table 4.

$$\text{error ratio (\%)}=[\ ]\text{corrected value } E-\text{ratio } Z3 \text{ of HbA2 peak area to total peak area]/ratio } Z3 \text{ of HbA2 peak area to total peak area}]\times100$$

The ratio E (%) of the HbA2 peak area to the total peak area obtained in Example 5 and the ratio Z3 of the HbA2 peak area to the total peak area were substituted into the following formula to calculate the error ratio. The results are shown in Table 4.

$$\text{error ratio (\%)}=[\ ]\text{ratio } E \text{ (\%) of HbA2 peak area to total peak area}-\text{ratio } Z3 \text{ of HbA2 peak area to total peak area]/ratio } Z3 \text{ of HbA2 peak area to total peak area}]\times100$$

TABLE 4

| | Ry | Corrected value E (%) | Ratio E of HbA2 peak area to total peak area (%) | Ratio Z3 of HbA2 peak area to total peak area (%) | Error ratio (%) |
|---|---|---|---|---|---|
| Example 5 | 1.115 | 2.44 | — | 2.6 | 6.2 |
| Comparative Example 5 | — | — | 3.73 | 2.6 | 43.5 |

Example 6

The whole blood of the mutant HbS carrier was diluted (dilution rate 41 times (mass basis)) with an alkaline solution (pH 8.8) having the above composition to obtain the sample F. In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), and Y peak=HbS peak.

A correction coefficient Ry was obtained based on the following formula.

$$Ry=(Ty-Tx)/(Ta2-Tx)$$

In the electropherogram, the ratio F (%) of the HbA2 peak area to the total peak area was determined.

The ratio F of the HbA2 peak area to the total peak area was corrected by Ry based on the following formula, and the corrected value F (%) was calculated. The results are shown in Table 5.

corrected value=ratio of HbA2 peak area to total
peak area/(−3.5×Ry+5.43)

Comparative Example 6

The ratio F (%) of the HbA2 peak area to the total peak area obtained in Example 6 is shown in Table 5 as Comparative Example 6.

<<Accuracy Evaluation>>

The ratio Z4(%) of the HbA2 peak area to the total peak area was determined in the electropherogram of the sample F by the control method (Capillarys 2, Sebia).

The corrected value F obtained in Example 6 and the ratio Z4 of the HbA2 peak area to the total peak area were substituted into the following formula to calculate the error ratio. The results are shown in Table 5.

error ratio (%)=[ ]corrected value *F*–ratio *Z*4 of
HbA2 peak area to total peak areal/ratio *Z*4 of
HbA2 peak area to total peak area]×100

The ratio F (%) of the HbA2 peak area to the total peak area obtained in Example 6 and the ratio Z4 of the HbA2 peak area to the total peak area were substituted into the following formula to calculate the error ratio. The results are shown in Table 5.

error ratio (%)=[ ]ratio *F* (%) of HbA2 peak area to
total peak area–ratio *Z*4 of HbA2 peak area to
total peak areal/ratio *Z*4 of HbA2 peak area to
total peak area]×100

TABLE 5

| | Ry | Corrected value F (%) | Ratio F of HbA2 peak area to total peak area (%) | Ratio Z4 of HbA2 peak area to total peak area (%) | Error ratio (%) |
|---|---|---|---|---|---|
| Example 6 | 1.151 | 2.51 | — | 2.9 | 13.4 |
| Comparative Example 6 | — | — | 3.52 | 2.9 | 21.4 |

Example 7

The whole blood of a healthy subject different from Example 1 was diluted with an alkaline solution (pH 8.8) having the above composition (dilution rate 41 times (mass basis)) to obtain the sample G. In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), Y peak=HbA peak.

A correction coefficient Ry was obtained based on the following formula.

*Ry*=(*Ty*–*Tx*)/(*Ta2*–*Tx*)

In the electropherogram, the ratio G (%) of the HbA2 peak area to the total peak area was determined.

The ratio G of the HbA2 peak area to the total peak area was corrected by Ry based on the following formula, and the corrected value G (%) was calculated. The results are shown in Table 6.

corrected value=ratio of HbA2 peak area to total
peak area/(−2.5×Ry+4.26)

Comparative Example 7

The ratio G (%) of the HbA2 peak area to the total peak area obtained in Example 7 is shown in Table 6 as Comparative Example 7.

<<Accuracy Evaluation>>

The ratio Z5(%) of the HbA2 peak area to the total peak area was determined in the electropherogram of the sample G by the control method (Capillarys 2, Sebia).

The corrected value G obtained in Example 7 and the ratio Z5 of the HbA2 peak area to the total peak area were substituted into the following formula to calculate the error ratio. The results are shown in Table 6.

error ratio (%)=[ ]corrected value *G*–ratio *Z*5 of
HbA2 peak area to total peak areal/ratio *Z*5 of
HbA2 peak area to total peak area]×100

The ratio G (%) of the HbA2 peak area to the total peak area obtained in Example 7 and the ratio Z5 of the HbA2 peak area to the total peak area were substituted into the following formula to calculate the error ratio. The results are shown in Table 6.

error ratio (%)=[ ]ratio *G* (%) of HbA2 peak area to
total peak area–ratio *Z*5 of HbA2 peak area to
total peak areal/ratio *Z*5 of HbA2 peak area to
total peak area]×100

TABLE 6

| | Ry | Corrected value G (%) | Ratio G of HbA peak area to total peak area (%) | Ratio Z5 of HbA peak area to total peak area (%) | Error ratio (%) |
|---|---|---|---|---|---|
| Example 7 | 1.262 | 2.69 | — | 2.5 | 7.6 |
| Comparative Example 7 | — | — | 2.98 | 2.5 | 19.2 |

Example 8

The sample H was obtained by diluting whole blood of a β-thalassemia patient with an alkaline solution (pH 8.8) having the above composition (dilution rate 41 times (mass basis)). In addition, hydrochloric acid and water were added until the pH of the solution reached 8.8.

The same measurement as in Example 1 was performed once, the X peak, the HbA2 peak, and the Y peak were specified from the electropherogram, and the detection time (Tx, Ta2, Ty) of each peak was specified.

Here, X peak=electro-osmotic flow (EOF) signal peak (signal of interface detection), Y peak=HbA peak.

A correction coefficient Ry was obtained based on the following formula.

*Ry*=(*Ty*–*Tx*)/(*Ta2*–*Tx*)

In the electropherogram, the ratio H (%) of the HbA2 peak area to the total peak area was determined.

The ratio H of the HbA2 peak area to the total peak area was corrected by Ry based on the following formula, and the corrected value H (%) was calculated. The results are shown in Table 7.

$$\text{corrected value} = \text{ratio of HbA2 peak area to total peak area}/(-2.5 \times Ry + 4.26)$$

Comparative Example 8

The ratio H (%) of the HbA2 peak area to the total peak area obtained in Example 8 is shown in Table 7 as Comparative Example 8.

<<Accuracy Evaluation>>

The ratio Z6(%) of the HbA2 peak area to the total peak area was determined in the electropherogram of the sample H by the control method (Capillarys 2, Sebia).

The corrected value H obtained in Example 8 and the ratio Z6 of the HbA2 peak area to the total peak area were substituted into the following formula to calculate the error ratio. The results are shown in Table 7.

$$\text{error ratio } (\%) = [\ ]\text{corrected value } H - \text{ratio } Z6 \text{ of HbA2 peak area to total peak area}]/\text{ratio } Z6 \text{ of HbA2 peak area to total peak area}] \times 100$$

The ratio H (%) of the HbA2 peak area to the total peak area obtained in Example 8 and the ratio Z6 of the HbA2 peak area to the total peak area were substituted into the following formula to calculate the error ratio. The results are shown in Table 7.

$$\text{error ratio } (\%) = [\ ]\text{ratio } H \ (\%) \text{ of HbA2 peak area to total peak area} - \text{ratio } Z6 \text{ of HbA2 peak area to total peak area}]/\text{ratio } Z6 \text{ of HbA2 peak area to total peak area}] \times 100$$

TABLE 7

|  | Ry | Corrected value G (%) | Ratio G of HbA peak area to total peak area (%) | Ratio Z6 of HbA peak area to total peak area (%) | Error ratio (%) |
|---|---|---|---|---|---|
| Example 8 | 1.313 | 4.84 | — | 4.9 | 1.2 |
| Comparative Example 8 | — | — | 4.74 | 4.9 | 3.2 |

From the above Examples and Comparative Examples, according to the present analysis method, it can be seen that it is possible to calculate the ratio of the HbA2 peak area or the like to the total peak area with excellent precision and accuracy.

1 capillary flow path
2 sample holding tank 2

3 electrophoretic liquid holding tank
4 detection unit
TX detection time of X peak
Ta2 detection time Ta2 of HbA2 peak
Ty detection time Ty of Y peak

What is claimed is:

1. A method for analyzing a sample comprising hemoglobin A2 (HbA2) by capillary electrophoresis using an alkaline aqueous solution comprising a cationic polymer, the method comprising:

obtaining an electropherogram of the sample by capillary electrophoresis;

specifying a detection time Tx of an X peak detected at a time earlier than an HbA2 peak;

specifying a detection time Ta2 of an HbA2 peak;

specifying a detection time Ty of a Y peak detected at a time later than the HbA2 peak;

calculating a correction coefficient from a relative relationship between the detection time Tx of the X peak, the detection time Ta2 of the HbA2 peak, and the detection time Ty of the Y peak;

calculating a ratio of an HbA2 peak area to a total peak area or a ratio of a Y peak area to the total peak area in the electropherogram; and correcting the ratio of the HbA2 peak area or the ratio of the Y peak area with the correction coefficient.

2. The method according to claim 1, wherein the correction coefficient is calculated from (Ty–Tx)/(Ta2–Tx) or (Ta2–Tx)/(Ty–Tx).

3. The method according to claim 1, wherein the correcting the ratio of the HbA2 peak area or the Y peak area is performed based on the correction coefficient and a predetermined coefficient different from the correction coefficient.

4. The method according to claim 3, wherein the predetermined coefficient varies according to a value of the correction coefficient.

5. The method according to claim 2, wherein:

the correcting the ratio of the HbA2 peak area or the Y peak area is performed based on the correction coefficient and a predetermined coefficient different from the correction coefficient, and the predetermined coefficient decreases as the value of the correction coefficient deviates from 1.

6. The method according to claim 1, wherein:

the capillary electrophoresis is performed using a device including a capillary flow path, and an inner wall of the capillary flow path is coated with a cationic polymer comprising a quaternary ammonium base.

7. The method according to claim 6, wherein the sample is continuously supplied to the capillary flow path.

*   *   *   *   *